United States Patent
Colombo

(10) Patent No.: US 11,925,911 B2
(45) Date of Patent: Mar. 12, 2024

(54) TWIN-SCREW MIXER-EXTRUDER, INCLUDING A PRESSER BODY FOR DEFINING A CONTROLLED VOLUME OF A COMPOUNDING CHAMBER

(71) Applicant: COLMEC S.p.A, Varese (IT)

(72) Inventor: Ubaldo Colombo, Varese (IT)

(73) Assignee: COLMEC S.p.A., Busto Arsizio (IT)

( * ) Notice: Subject to any disclaimer, the term of this patent is extended or adjusted under 35 U.S.C. 154(b) by 776 days.

(21) Appl. No.: 16/970,402

(22) PCT Filed: Feb. 13, 2019

(86) PCT No.: PCT/IB2019/051145
§ 371 (c)(1),
(2) Date: Aug. 17, 2020

(87) PCT Pub. No.: WO2019/162803
PCT Pub. Date: Aug. 29, 2019

(65) Prior Publication Data
US 2021/0113975 A1    Apr. 22, 2021

(30) Foreign Application Priority Data
Feb. 20, 2018    (IT) .................. 102018000002860

(51) Int. Cl.
*B01F 27/722*    (2022.01)
*B01F 101/00*    (2022.01)

(52) U.S. Cl.
CPC .... *B01F 27/722* (2022.01); *B01F 2101/2805* (2022.01)

(58) Field of Classification Search
CPC ........... B01F 27/722; B01F 2101/2805; B29C 48/2552; B29C 48/387
(Continued)

(56) References Cited

U.S. PATENT DOCUMENTS 2,767,437 A  *  10/1956  Marshall ................ C11D 13/18
                                                                425/197
3,386,131 A       6/1968  Marcello
(Continued)

FOREIGN PATENT DOCUMENTS

CN        206170388 U    5/2017
DE     102007033355 A1   3/2008
(Continued)

*Primary Examiner* — Marc C Howell
(74) *Attorney, Agent, or Firm* — Bay State IP, LLC

(57) ABSTRACT

It is described an apparatus for the extrusion and mixing of plastic materials, for example rubber-based and silicone-based materials, comprising a dump extruder body whereon two conical screws (2) converging towards an extrusion die (3) suitable for being occluded by closing means (4) are mounted, the conical screws (2) being accommodated within a low-pressure compounding chamber (1) and within a pair of converging conical channels also defining a high-pressure chamber (2'), said low-pressure chamber (1) corresponding to an upstream area with respect to an extrusion direction, wherein said high-pressure chamber (2') and/or said low-pressure chamber (1) accommodate a presser body (5, 5', 6), defining a movable wall suitable for causing a controlled change in the volume of the respective chamber (1, 2').

9 Claims, 4 Drawing Sheets

(58) Field of Classification Search
USPC .......................................................... 366/97
See application file for complete search history.

(56) References Cited

U.S. PATENT DOCUMENTS

| | | | | |
|---|---|---|---|---|
| 4,084,263 | A * | 4/1978 | Millauer | ................. B29B 7/263 |
| | | | | 366/291 |
| 4,512,664 | A * | 4/1985 | Oiwa | ..................... B29B 7/246 |
| | | | | 141/258 |
| 5,529,390 | A * | 6/1996 | Giani | ..................... B29B 7/246 |
| | | | | 366/76.6 |
| 6,422,733 | B1 * | 7/2002 | Adams | .................. B29B 7/7495 |
| | | | | 366/76.7 |
| 2016/0361697 | A1 | 12/2016 | Urakami et al. | |
| 2017/0165872 | A1 | 6/2017 | Renard et al. | |

FOREIGN PATENT DOCUMENTS

| | | | | |
|---|---|---|---|---|
| EP | | 1543930 A2 | 6/2005 | |
| EP | | 1552914 A1 | 7/2005 | |
| JP | | 11198214 A * | 7/1999 | ............. B29B 7/485 |
| WO | | 2005/039847 A1 | 5/2005 | |

\* cited by examiner

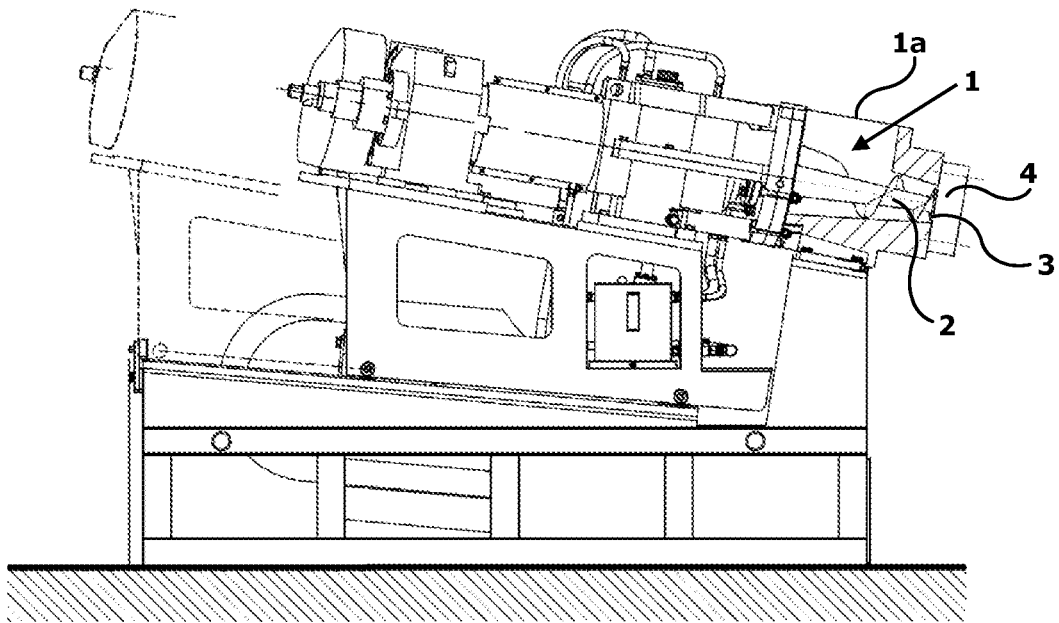
Fig. 1
PRIOR ART
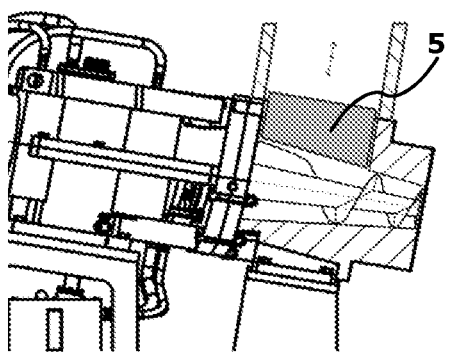
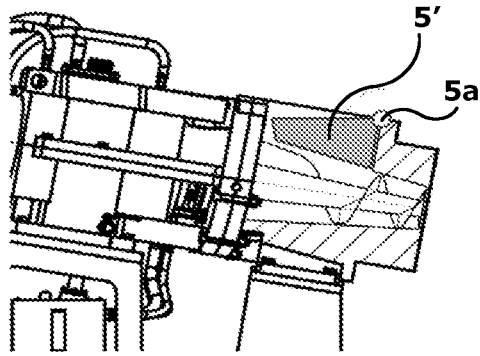
Fig. 2A          Fig. 2B

TWIN-SCREW MIXER-EXTRUDER, INCLUDING A PRESSER BODY FOR DEFINING A CONTROLLED VOLUME OF A COMPOUNDING CHAMBER

CROSS REFERENCE TO RELATED APPLICATION

This application is for entry into the U.S. National Phase under § 371 for International Application No. PCT/IB2019/051145 having an international filing date of Feb. 13, 2019, and from which priority is claimed under all applicable sections of Title 35 of the United States Code including, but not limited to, Sections 120, 363, and 365 (c) and which in turn claims priority under 35 USC 119 to Italian Patent Application No. 102018000002860 filed on Feb. 20, 2018.

FIELD OF THE INVENTION

The present invention relates to a mixer-extruder for rubber, silicone, plastic and thermoplastic materials, or other materials, more specifically, to a mixer-extruder provided with means for temporarily adjusting the compounding chamber.

TECHNICAL BACKGROUND

It is well known that in some types of screw extruders for synthetic materials, notably materials having a good degree of elasticity such as rubber, elastomers, plastic and/or thermoplastic materials, or silicone, feeding to the extrusion screw is carried out through a loading hopper open to the upper side.

A commercially available extrusion machine which proved to be particularly effective is the one described in WO 2005/039847 in the name of the same Applicant, herein incorporated as a reference, where a compounding function has been provided in an extruder of the twin-screw dump extruder type.

More precisely, referring to FIG. 1 illustrating, partially in section, such a prior art machine, a compounding chamber 1 accommodates a pair of extrusion conical screws 2 which push the material towards an extrusion die 3, which can be closed by a blind flange or closing cover 4. The compounding chamber 1 is provided with an inlet 1a which is open to a feed hopper (not shown). The closing cover 4 occludes the extrusion die 3 and forces the material to recirculate into the compounding chamber 1, causing a compounding by the two conical screws. The material is actually driven forwardly, i.e. towards extrusion die 3, by the pair of counter-rotating screws, and then forced to go back when the die is occluded by the cover 4. In certain applications, the rotation of the two screws may be also temporarily reversed, to improve the effect of compounding.

The cover 4 can be opened or easily removed, so as to keep the extrusion die 3 occluded during the compounding step, until desired, and then opened to allow the extruded material to outflow at the end of mixing.

When the extrusion die 3 of the dump extruder is closed by the cover 4, the material which is introduced by the hopper is forced to recirculate on itself inside the chamber 1, being thus homogeneously compounded.

Notably, in operation, with the blind flange 4 arranged in a closed position, the load to be compounded—e.g. a compound already pre-mixed in another machine, or bulk ingredients such as rubbers, fillers, accelerators, etc.—is loaded into the feed hopper and fed into the compounding chamber 1 while the motor keeps in counter-rotation the conical screws, which push the material to be compounded towards the die. However, the closing cover 4 does not allow the mixture to outflow from the chamber 1, and forces the mixture to recirculate back to the chamber. An increasing pressure gradient is thus determined between a low-pressure material feeding area and a high-pressure "ducted" area in the proximity of the blind flange 4. The recirculation between areas having variable pressure of the various basic components allows a quick and effective compounding of the mixture.

The two counter-rotating conical screws are accommodated partly within the large chamber 1, where the material is loaded, and partly in converging and intersecting conical channels, wherein the peripheral profile of the screw threads runs adjacent to the channel surface. The material is thus forced to follow the vane profile of the screw to a progressively narrower volume, increasing the pressure. In order to achieve a recirculation of the material (when the cover 4 is closed), at least in the most advanced area of the conical channels, the peripheral wall is provided with an enlargement, such that the screw vane is at a certain distance from the wall. Typically, the enlargement is provided at the upper part of the accommodating channels. Thanks to the presence of this enlargement of the channel for accommodating the extrusion screws, the material is allowed to circulate backwards, when the cover is closed, returning to a low-pressure area of the chamber 1, and thus resulting in an effective compounding.

Although this extruder is fully functional, the applicant has found that there is room for improvement. Indeed, it has been noted that the material to be compounded is freely disposed within the mixing chamber 1 based on the local pressures, and this causes possible stagnation or delays in mixing, and sometimes an excessive increase in the temperature and pressure of the material. Therefore, it would be desirable to better control the process during the compounding step.

In the prior art, some singular configurations of extruders have already been proposed, wherein mobile elements are used to control at least the input of the material into the extruder screws. For example, DE102007033355 discloses an extruder provided with a material thrusting plate, which operates in the inlet hopper in the extruder. By contrast, US2016/0361697 relates to a mixer, wherein a removable closing element, which opens and closes the material mixing chamber, is provided. However, none of these prior art systems is able to control, during the process, the pressure and temperature conditions of the material being compounded, adapting both to the compounding conditions and to the extrusion conditions.

PROBLEM AND SOLUTION

Therefore, the underlying problem of the invention is to supply an extrusion and compounding machine of a rubber-based or silicone-based material, as described above, which overcomes the aforementioned drawbacks and which allows greater control on the mixing and the temperature/pressure of the material, as well as on compounding times during processing.

This object is achieved through the features defined in essential terms in the appended claims.

Notably, according to a first aspect, there is provided an apparatus for the mixing and extrusion of plastic materials, for example rubber-based and silicone-based materials, comprising a dump extruder body wherein two conical screws converging towards an extrusion die suitable for being occluded by closing means are mounted, the conical screws being accommodated within a low-pressure compounding chamber and within a pair of converging conical channels also defining a high-pressure chamber, said low-pressure chamber corresponding to an upstream area with respect to an extrusion direction, wherein in said high-pressure chamber and/or in said low-pressure chamber a presser body, forming a movable wall suitable for causing a controlled change in the volume of the respective chamber, is provided.

According to a preferred aspect, at least said high-pressure chamber is provided with a presser body controlled in position.

According to another aspect, the presser body of the low-pressure chamber is arranged so as to occlude a plastic material loading opening, such as an inlet hopper of the dump extruder body.

Typically, the presser body is mounted so as to be slidably movable but can also be mounted so as to have one or more degrees of rotation. The presser body is movable between a lifted (or home) position and a lowered (or operating) position, preferably under the action of a controlled actuator. According to a variant, the actuator determines a constant position of said presser during mixing.

According to a preferred aspect, the presser body has a movable wall shaped as two intersecting conical surface portions, so as to adapt and follow the profile of the vanes of the two screws.

It is understood that the presser body is displaced in position at least during a compounding step, wherein said closing means prevent the plastic material from passing through said extrusion die.

The closing means may also be in the form of an extraction gear pump which is stopped and occludes the outlet of said die.

BRIEF DESCRIPTION OF THE DRAWINGS

Further features and advantages of the invention are anyhow more evident from the following detailed description of some preferred embodiments, given by mere way of non-limiting example and illustrated in the accompanying drawings, wherein:

FIG. 1, as already mentioned, is a side elevation, partially sectional, view of a prior art extruder/mixer system;

FIG. 2A is a schematic enlarged view of a detail of the single compounding chamber of FIG. 1, but relating to an extruder system according to a first embodiment of the invention;

FIG. 2B is a view similar to the one in FIG. 2A, but relating to a variant of the first embodiment;

DETAILED DESCRIPTION OF PREFERRED EMBODIMENTS

Figure 3A:
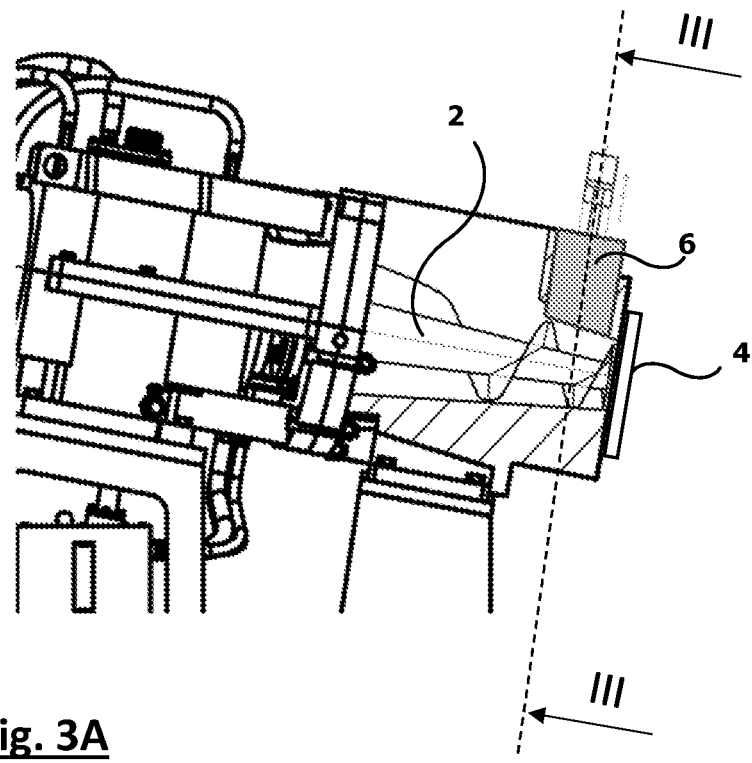
FIG. 3A is a view similar to the one in FIG. 2A, but relating to a second preferred embodiment of the invention.

An extrusion and mixing machine consists of the basic elements shown in FIG. 1 and already described in the introductory section with reference to the Document WO 2005/039847 incorporated herein as a reference.

Notably, a "dump extruder" machine has a machine body defining a compounding chamber 1 which accommodates a pair of conical extrusion screws 2, arranged with intersecting spiral vanes spirals and axes converging towards an extrusion die 3.

The extrusion die 3 may be occluded by suitable closing means 4 (schematically illustrated in figures), such as a removable cover, or simply by an extraction gear pump which is stopped and occludes the outlet of the die.

The compounding chamber 1 has an upper inlet 1a from which the material, such as rubber-based or silicone-based material, to be processed is introduced.

In the front part of the chamber 1, in the proximity of the extrusion die 3, the pair of conical screws 2 is accommodated within converging conical channels with inner walls almost touching the vane edges of the conical screws. The sectional profile of such conical channels is therefore shaped as two intersecting circles. In at least one area of such sectional profile, the inner wall of the channels has an enlargement, thus detaching from the vanes of the conical screws 2 and defining a material recirculating chamber. Typically, such enlargement is provided in the upper part of the conical screws 2 (see area 2' in FIG. 4B).

Referring now to FIGS. 2A and 2B, it should be noted that, according to a first embodiment of the invention, the inlet 1a of the compounding chamber 1 is provided with an occluding body 5, hereinafter referred to as presser, which is mounted so as to be lifted and lowered.

Notably, according to a first variant, the presser 5 is mounted so as to be linearly slidable between a lifted position and a position in contact with the material inside the chamber 1 (as in FIG. 2A); in this case, the presser 5 is essentially made similarly to a piston, which occludes the inlet 1a and is movable therein substantially according to an axis substantially perpendicular to the lying plane of the pair of screws 2, so as to be an element for variably closing the chamber 1.

According to a second variant, a presser 5' is mounted pivoting about a hinge 5a, between an upwardly rotated position and a downwardly rotated position (as in FIG. 2B), wherein it is in contact with the material inside the chamber.

The presser 5 or 5' is mounted with a certain clearance with respect to the inlet 1a, so it is not necessary to seal the entrance to the chamber 1, and is intended to rest on the material which is compounded inside the chamber, for imparting locally—in the low-pressure area of chamber 1—a pressure to the material itself. In other words, the presser 5 or 5' is intended to reduce the volume of the chamber 1 in a controlled way, so as to be able to regulate the pressure and temperature of the material as desired in a controlled way.

The localized pressure action by the presser 5 exerts an advantageous effect on the material being compounded by the pair of conical screws. Notably, the material on its way back from the high-pressure area to the low-pressure area, is kept inside the vanes of the conical screws by the presser, which improves the mixing effect.

The pressure in this low-pressure area of the chamber 1 allows to better control the amount of reflux of the material, so as to favour and accelerate the homogenization effect of the material.

For this purpose, the presser can be made either simply in the form of a heavy body mounted movable—as seen above—in such a way that the same pressure (due to its own weight under the effect of gravity) is always applied to the material, or in the form of a movable piston under the action of a controlled actuator (not shown), such as a hydraulic, electric or pneumatic jack.

In the second case, the actuator may be controlled so as to exert a constant force—and thus produce an effect similar to that of a weight—or so as to keep the piston in a fixed position, thereby actually setting a desired volume where the pressure may vary cyclically. Furthermore, the position and pressing force of the presser 5, 5' may vary and be set during the compounding and extrusion cycle.

The presser 5 does not necessarily have a circular cross-sectional shape, but may take any other shape, e.g. a square, rectangular, triangular or circle sector section. Obviously, it is required only that it has a shape able to fit the contour of the inlet 1a.

In the two variants of the first embodiment of FIGS. 2A and 2B, the presser 5, 5' is applied in the so-called low-pressure area of the chamber 1, i.e. the area immediately next to the loading inlet 1a.

By contrast, in a preferred embodiment (FIGS. 3A-4B), a presser 6 operates in the high-pressure area of the extrusion chamber 1, i.e. in the area where the two conical screws are accommodated within the respective conical channels. In the high-pressure chamber, pressure is normally in the range from 5 to 200 bar. In this case, the inlet 1a of the hopper could be opened or closed by a simple cover defining a constant volume, and the pressure control on the compounded material is exerted by the presser 6 only.

Figure 3B:
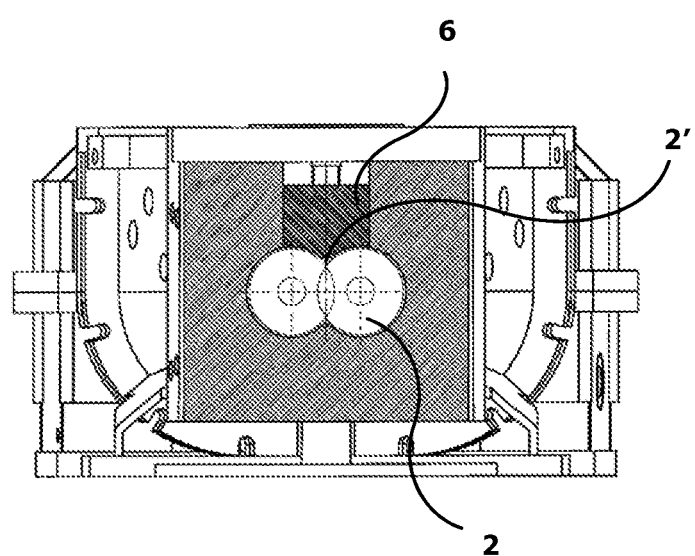
FIG. 3B is a cross-sectional view, taken along the line III-III of FIG. 3A.
Figure 4A:
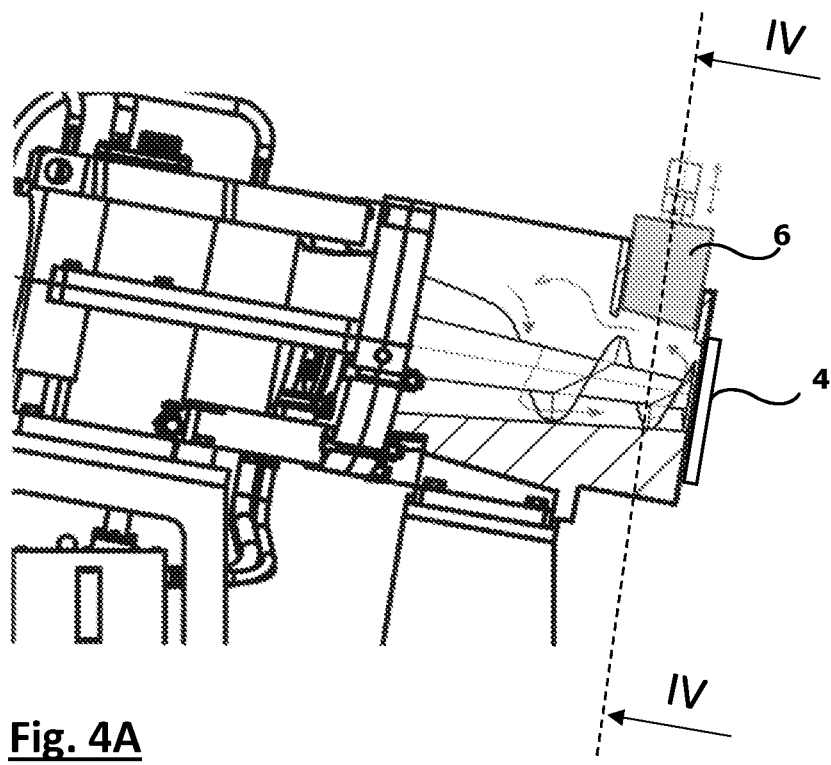
FIG. 4A is a view similar to FIG. 3A in an enlarging step of the recirculation chamber.
Figure 4B:
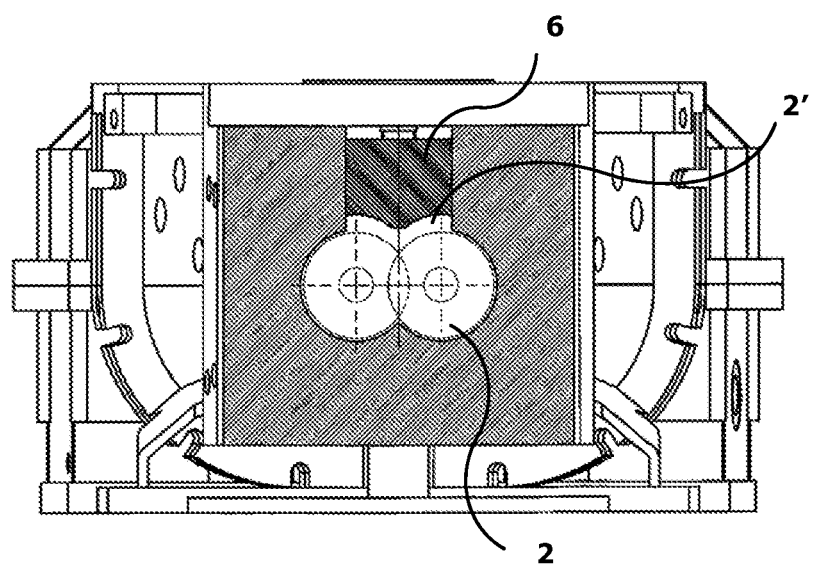
FIG. 4B is a cross-sectional view, taken along the line IV-IV of FIG. 4A.
Figure 5:
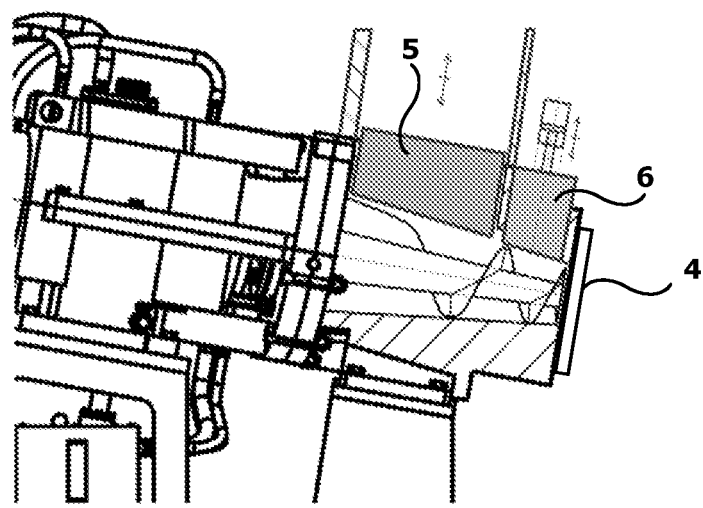
FIG. 5 is a view similar to the one in FIG. 2A, but relating to a third embodiment.

Notably, as well represented by the comparison of FIGS. 3B and 4B, in this preferred embodiment, the presser 6 constitutes a movable wall of an enlargement of the conical channels which defines a high-pressure compounding chamber 2'. By displacing the presser 6, it is therefore possible to control the change in volume of the high-pressure compounding chamber 2', thus determining a change in pressure and, indirectly, in temperature of the material being processed.

In this case, since the presser 6 operates in the high-pressure area, where the wall of the conical channels is adjacent to the vanes edges of the screws, the presser 6 defines a movable wall which is shaped as two intersecting conical surface portions, which constitutes indeed a part of the respective conical channels (as can be clearly seen in FIG. 4B).

Since the size of the high-pressure area is also far lower than that of the low-pressure area, it is certainly preferable that the presser 6 is controlled by an actuator which, while acting on a smaller presser, is able to exert a sufficient overall pressure on the material. Moreover, the changes in volume in this area, i.e. on the high-pressure compounding chamber, prove to be very effective, since they cause a high percentage change, and therefore have a significant impact on the behaviour of the material.

According to a third embodiment, there are provided both a presser 5, 5' in the low-pressure area, and a controlled presser 6 in the high-pressure area. The control action is preferably carried out on both pressers, so as to have the greatest intervention flexibility.

As can be understood, by using mobile pressers 5, 5' and/or 6 which vary the volume of the high-pressure chamber 2' and/or of the low-pressure chamber 1, it is possible to place an additional control element, which allows to regulate optimally the degree of mixing and the process speed/performance.

It has also been found that it is convenient to control the intervention of the pressers even during the extrusion step, i.e. when the closing cover 4 is opened and the material is extruded through the die 3. In this step, it is therefore possible to better regulate the material outflow pressure and an improved emptying of the compounding chamber, avoiding air inclusions in the material, if any.

It is understood, however, that the invention is not to be considered as limited to the particular arrangements illustrated above, which represent only some exemplary implementations thereof, but different variants are possible, all within the reach of a person skilled in the art, without departing from the scope of the invention itself, as defined by the following claims.

The invention claimed is:

1. An apparatus for the mixing and extrusion of plastic materials, comprising:
    a dump extruder body;
    an extrusion die (3);
    two conical screws mounted on the dump extruder body and converging towards the extrusion die (3);
    a closing means (4);
    wherein the conical screws (2) being accommodated within a low-pressure compounding chamber (1) and within a pair of converging conical channels also defining a high-pressure chamber (2'), said low-pressure compounding chamber (1) corresponding to an upstream area with respect to an extrusion direction, characterized in that
    in said high-pressure chamber (2') there is provided a first presser body (5, 5', 6), which forms a movable wall suitable for defining a controlled change in the volume of the respective chamber (2'), and wherein
    said first presser body (6) is displaced in position at least during a compounding step wherein said closing means (4) prevent the plastic material from passing through said extrusion die (3).

2. The apparatus as in claim 1, wherein said high-pressure chamber (2') is provided with said first presser body (6) controlled in position.

3. The apparatus as in claim 1, wherein in said low-pressure chamber (1) there is also provide a second presser body (5, 5') arranged so as to occlude a plastic material loading opening (la).

4. The apparatus as in claim 1, wherein either said first and second presser body (5, 6) is mounted slidably movable.

5. The apparatus as in claim 1, wherein either said first and second presser body (5, 6) is movable between a lifted position and a lowered position under the action of a controlled actuator.

6. The apparatus as in claim 5, wherein said actuator determines a constant position of said first and second presser body (5, 6).

7. The apparatus as in claim 1, wherein said first presser body (6) has a movable wall shaped as two intersecting conical surface portions.

8. The apparatus as in claim 1, wherein said closing means (4) are in the form of an extraction gear pump which is stopped and occludes the outlet of said die (3).

9. The apparatus as in claim 1, wherein said first pressor body (6) constitutes a movable wall of an enlargement of conical channels which define said high-pressure chamber (2').

* * * * *